United States Patent
Sherman-Presser et al.

(10) Patent No.: US 9,467,408 B1
(45) Date of Patent: Oct. 11, 2016

(54) INTERACTIVE COMMENTARY BASED ON VIDEO-CONTENT CHARACTERISTICS

(71) Applicant: LinkedIn Corporation, Mountain View, CA (US)

(72) Inventors: Jonathan L. Sherman-Presser, San Francisco, CA (US); Marvin H. Li, New York, NY (US); Yoonjeong Yang, San Francisco, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 14/979,228

(22) Filed: Dec. 22, 2015

(51) Int. Cl.
*H04L 12/58* (2006.01)
*H04L 29/06* (2006.01)
*H04L 29/08* (2006.01)

(52) U.S. Cl.
CPC ............. *H04L 51/12* (2013.01); *H04L 65/601* (2013.01); *H04L 67/02* (2013.01); *H04L 67/306* (2013.01)

(58) Field of Classification Search
CPC ............. G06Q 50/01; G06Q 30/0277; G06Q 30/0251; G06Q 30/0269; G06F 17/30702; H04L 67/306
See application file for complete search history.

(56) References Cited

U.S. PATENT DOCUMENTS

| | | | | |
|---|---|---|---|---|
| 8,620,723 B1 * | 12/2013 | Good | ..................... | G06Q 30/00 705/319 |
| 2009/0248516 A1 * | 10/2009 | Gross | ................ | G06F 17/30899 705/14.66 |
| 2011/0238754 A1 * | 9/2011 | Dasilva | ................ | G06F 17/3082 709/204 |
| 2011/0320373 A1 * | 12/2011 | Lee | ........................ | G06Q 50/01 705/319 |
| 2012/0159635 A1 * | 6/2012 | He | ...................... | G06F 21/6245 726/26 |
| 2012/0266081 A1 * | 10/2012 | Kao | ........................ | G06Q 50/01 715/751 |
| 2012/0331496 A1 * | 12/2012 | Copertino | ........ | H04N 21/25866 725/14 |
| 2013/0004138 A1 * | 1/2013 | Kilar | ................... | H04N 21/4756 386/230 |
| 2013/0204664 A1 * | 8/2013 | Romagnolo | ....... | G06Q 30/0203 705/7.32 |
| 2013/0227384 A1 * | 8/2013 | Good | ...................... | H04L 67/10 715/205 |
| 2013/0298006 A1 * | 11/2013 | Good | ................... | G06Q 10/107 715/234 |
| 2013/0346877 A1 * | 12/2013 | Borovoy | ............... | H04L 65/403 715/753 |
| 2014/0013246 A1 * | 1/2014 | Beechuk | ............... | H04L 65/403 715/753 |
| 2014/0108585 A1 * | 4/2014 | Barton | ............. | G06F 17/30905 709/213 |
| 2015/0181301 A1 * | 6/2015 | Bloch | .............. | H04N 21/47217 725/41 |
| 2015/0200988 A1 * | 7/2015 | Cabanillas | .............. | H04L 65/60 709/203 |
| 2016/0034459 A1 * | 2/2016 | Larsen | ............. | G06F 17/30044 707/740 |
| 2016/0057154 A1 * | 2/2016 | Ferguson | ............. | H04L 63/104 726/7 |
| 2016/0086218 A1 * | 3/2016 | Li | ........................... | H04L 51/32 705/14.51 |
| 2016/0098602 A1 * | 4/2016 | Guegan | ............. | G06K 9/00758 725/9 |

* cited by examiner

*Primary Examiner* — Backhean Tiv
(74) *Attorney, Agent, or Firm* — Park, Vaughan, Fleming & Dowler LLP

(57) ABSTRACT

In order to obtain comments about video content (such as a posted video), a subset of users of a social network may be dynamically identified. This subset of users may be relevant to or may have expertise about the video content. For example, the subset of users may be identified based on their user or member profiles and characteristics of the video content. Then, requests may be iteratively provided to the subset of the users to encourage them to comment on the video content, as well as previous comments from the subset of the users. After editing the comments (which may include reordering the comments that are received at different times), the edited comments may be subsequently presented to the users of the social network.

20 Claims, 7 Drawing Sheets

INTERACTIVE COMMENTARY BASED ON VIDEO-CONTENT CHARACTERISTICS

BACKGROUND

1. Field

The described embodiments relate to techniques for dynamically collecting information. More specifically, the described embodiments relate to techniques for dynamically identifying individuals that can collect an image or video about an event, and/or who can provide comments about an image or video.

2. Related Art

The popularity and increasing capabilities of cellular telephones are allowing people to generate an ever-increasing amount of content. For example, people regularly use the cameras that are integrated into their cellular telephones to capture pictures and videos of events. Often, they then post these pictures and videos online, such as on blogs, web pages or websites.

However, this approach to content acquisition is often flawed. For popular or significant events (such as an accident or a crime scene), there is typically a large amount of available content. But for less popular or less common topics, there may be little or no content available. Moreover, even when there is a large amount of available content, the quality can vary dramatically from one image or video to another.

Similarly, the quality of comments that are posted about images and videos also varies considerably. For example, comments are usually provided by highly motivated individuals. However, these individuals may be unhappy about something, which can color or distort their comments. In addition, in the absence of a monitored forum, the tone of comments posted online usually degrades and can become negative or even hostile.

Therefore, acquiring content is often, to a great degree, random in nature. It typically depends on individual decisions that cannot be changed after the fact. Consequently, the resulting mosaic of content is akin to painting a wall by throwing balls of paint at it. Eventually, the wall may be covered in paint, but at best the result is likely to be spotty. These gaps and varying quality in available content can be frustrating to users who attempt to access such content on web pages or websites.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
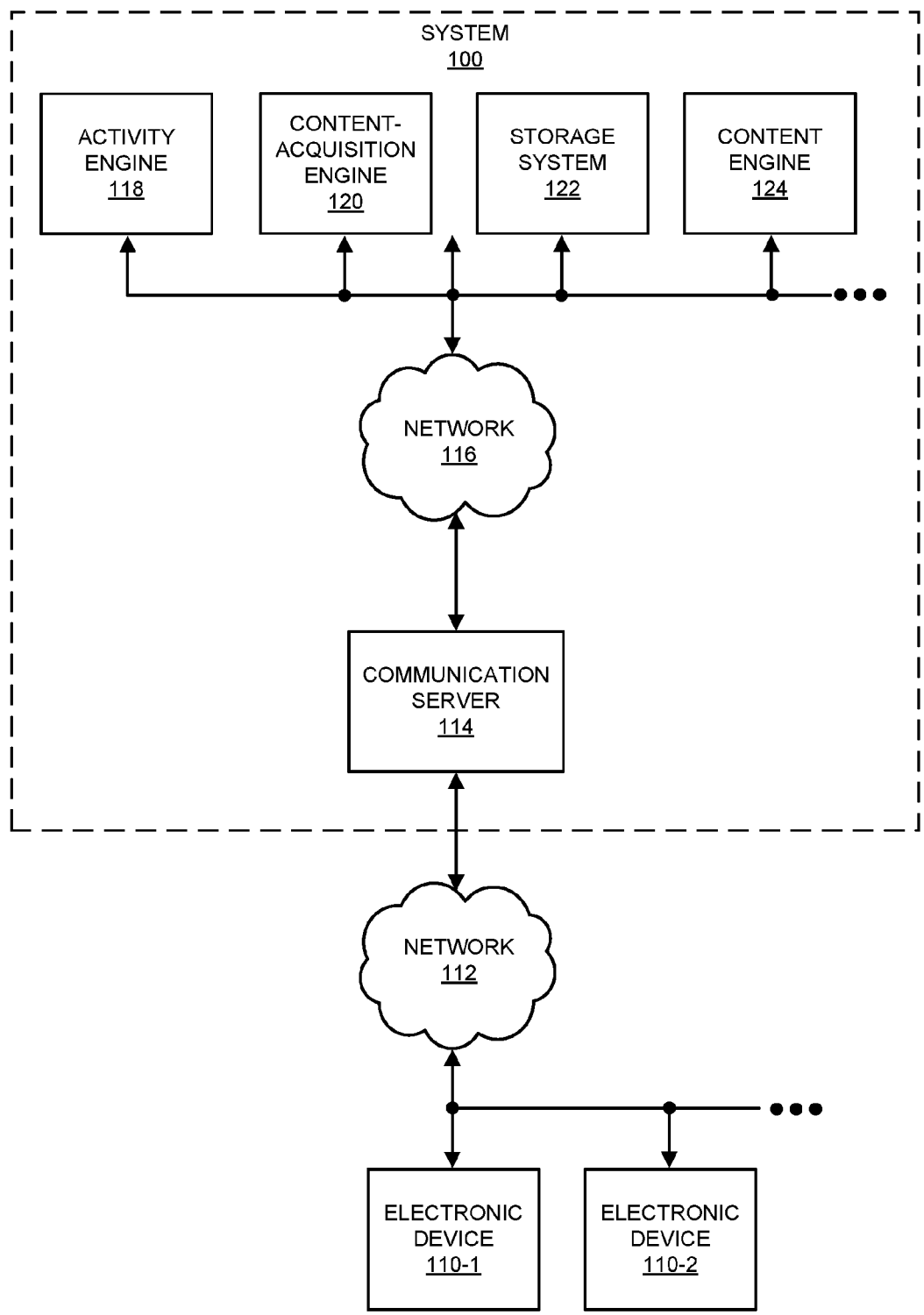
FIG. 1 is a block diagram illustrating a system used to aggregate content in accordance with an embodiment of the present disclosure.

In order to acquire content about an event, a collection group of users of a social network may be dynamically identified. This collection group of users may be relevant to and/or proximate to the event. For example, the collection group of users may be identified based on overlap between their user or member profiles (such as attributes, skills, employment history, and education of the users) and characteristics of the event (such as the location and the time of the event). Then, recommendations may be provided to the collection group of the users to acquire content, such as an image or a video associated with the event. Moreover, acquired content may be subsequently presented to the users of the social network. In addition, the behaviors of the users in the social network (such as a number of views of the content and/or a duration of the views) may be used to determine the event characteristics that are the most interesting to the users, thereby improving future content acquisition.

Alternatively or additionally, a subset of users of the social network that can provide quality comments about video content (such as a video) may be dynamically identified. This subset of users may be relevant to or may have expertise about the video content. For example, the subset of users may be identified based on their user or member profiles and characteristics of the video content. Then, requests may be iteratively provided to the subset of the users to encourage them to comment on the video content and/or previous comments from other users. After editing the comments (which may include reordering the comments that are received at different times), the edited comments may be subsequently presented to the users of the social network.

In this way, users who are or will be located near the event and/or who have expertise about the event may be encouraged to acquire related content. Alternatively or additionally, users who have expertise or relevance to particular content or the related event may be requested to comment on it, thereby facilitating an ongoing dialog or discussion about the content that is potentially of interest to other users of the social network. This content-acquisition technique may increase the likelihood that content and/or comments associated with the event will be acquired and that the content and/or comments will be of high quality. In addition, the collection group and/or the subset of the users identified using this content-acquisition technique may be experts about the event and/or content, as well as people who are influential in the social network. Consequently, the acquired content may be of interest to other members of the social network, thereby increasing their engagement with the social network, which may increase membership in the social network and may increase the revenue and profitability of a provider of the social network.

In the discussion that follows, the content-acquisition technique may be used by a person (for example, an existing user of the social network or a new user of the social network, who are sometimes referred to as 'members'). Also, or instead, the content-acquisition technique may be used by any type of organization, such as a business. Furthermore, a 'business' should be understood to include for-profit corporations, non-profit corporations, groups (or cohorts) of individuals, sole proprietorships, government agencies, partnerships, etc.

We now describe embodiments of the system and its use. FIG. 1 presents a block diagram illustrating a system 100 that performs the content-acquisition technique. In this system, users of electronic devices 110 may use a software product, such as instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

Using one of electronic devices 110 (such as electronic device 110-1) as an illustrative example, a user of electronic device 110-1 may use the software application to interact with other users in a social network (and, more generally, a network of users), such as a professional social network, which facilitates interactions among the users. As described further below with reference to FIG. 6, the interactions among the users may specify a social graph in which nodes correspond to the users and edges between the nodes correspond to the users' interactions, interrelationships, and/or connections.

Note that each of the users of the software application may have an associated user profile that includes personal and professional characteristics and experiences, which are sometimes collectively referred to as 'attributes' or 'characteristics.' For example, a user profile may include: demographic information (such as age and gender), geographic location, work industry for a current employer, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors may include: log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network.

In particular, when using the software application, the users may view content that was posted by other users of the social network. The content may include images or videos. However, it may include a wide variety of content types, including: documents (such as word-processor documents or files), presentations, spreadsheets, web pages, websites, albums with multiple pictures, etc. In general, the content may include: audio, video, text, graphics, multimedia content, verbal, written, and/or recorded information (such as comments or commentary). Note that content may be presented to the users by content engine 124 via the software application that executes in the environment of electronic devices 110.

Over time, via network 116, an activity engine 118 in system 100 may aggregate viewing behavior of the users when they view the content. This aggregated information may be stored in a data structure, which is stored in a computer-readable memory, such as storage system 122 that may encompass multiple devices, i.e., a large-scale storage system. For example, the viewing behavior for a particular video may include an average number of images in the document that are viewed by the users and/or a number of views of the video by the users.

Figure 2:
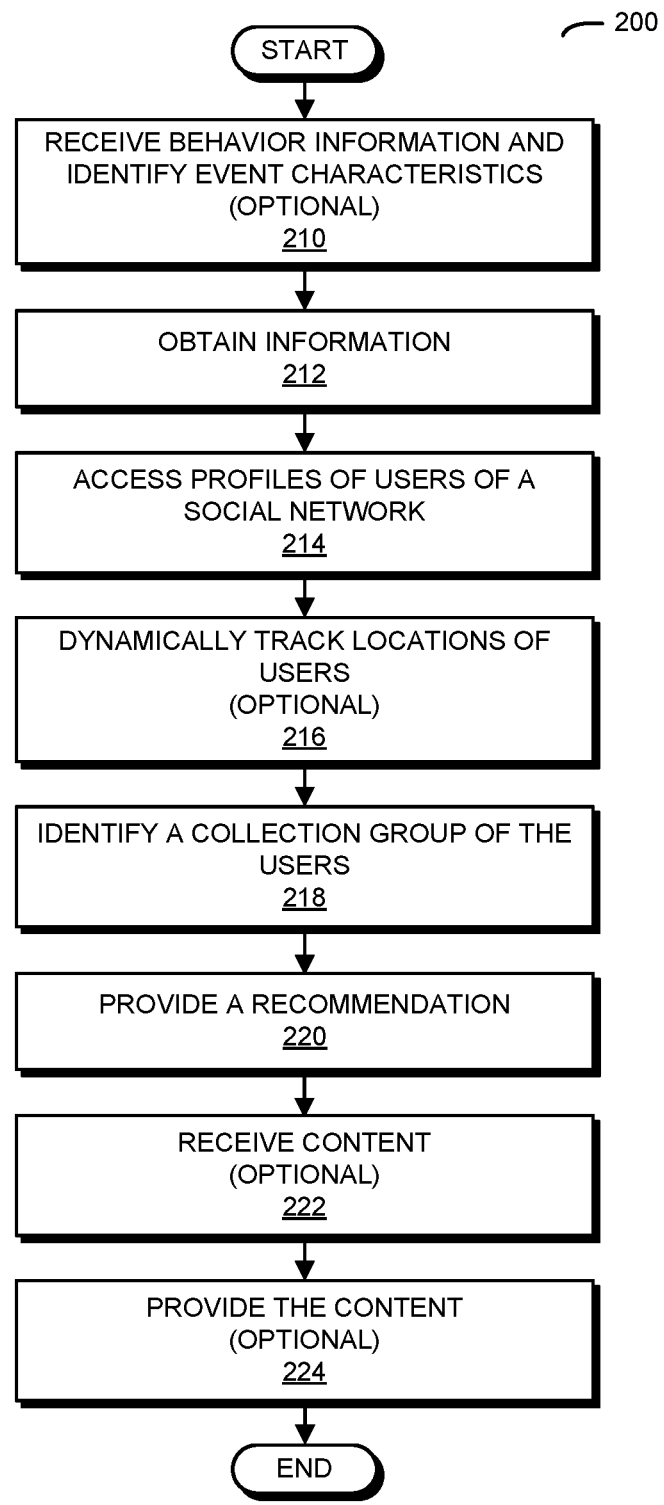
FIG. 2 is a flow chart illustrating a method for recommending content to acquire in accordance with an embodiment of the present disclosure.
Figure 3:
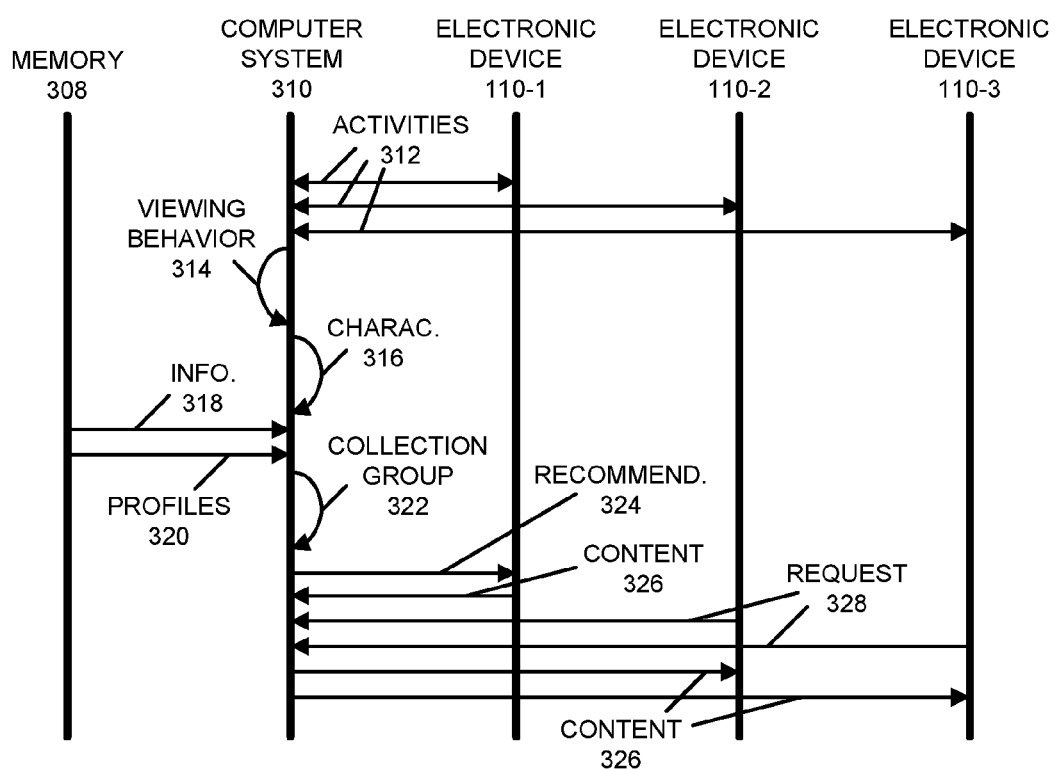
FIG. 3 illustrates communication between the electronic devices of FIG. 1 in accordance with an embodiment of the present disclosure.

As described further below with reference to FIGS. 2 and 3, based on the user behaviors, characteristics of events that are of interest to at least some of the users may be determined by activity engine 118. For example, the event characteristics that are of interest to at least some of the users may be determined. These event characteristics and/or content characteristics may be stored in storage system 122. Note that the characteristics may include: attributes, features, qualities, properties, traits, aspects, elements, facets, classifications, etc. of the events.

Subsequently, content-acquisition engine 120 may receive or access information specifying an event that has associated characteristics. Based on the stored event characteristics, content-acquisition engine 120 may determine that this event is likely to be of interest to the users of the social network. In response, content-acquisition engine 120 may use the user profiles and the characteristics of the event to identify a collection group of the users that are in a position to acquire content about the event and/or who are relevant to the event (such as users that are experts about the event and/or who are influential in the social network on this or similar topics). For example, content-acquisition engine 120 may identify the collection group of the users based on a statistical association between the attributes in the user profiles and the characteristics of the event. Moreover, the collection group of the users may be proximate to the event, such as nearby (e.g., in the same city or town) or at the event. Note that in order to identify users that are proximate to the event, content-acquisition engine 120 may dynamically track locations of electronic devices 110 (e.g., using a Global Positioning System, a cellular-telephone system, a wireless local area network, a local positioning system, etc.).

Next, content-acquisition engine 120 may provide a recommendation to one or more of the users in the collection group to acquire content about or associated with the event. For example, content-acquisition engine 120 may send an email or text message to a user about the event (including information specifying the location and the time of the event, characteristics of the event, etc.), and request that the user acquire an image or a video of the event and/or that the user provide commentary about the event.

In response to the recommendation, one or more of the users may acquire content about or associated with the event. For example, a user may acquire a video using electronic device 110-1 and may upload this video (along with optional associated commentary) to content-acquisition engine 120 via network 112, communication server 114 and network 116. This content may be stored in storage system 122 and, subsequently, content engine 124 may provide the content to one or more users of system 100 (and, thus, of the social network), such as in response to requests from one or more electronic devices 110, which are associated with the one or more users, to view the content.

Alternatively or additionally, as described further below with reference to FIGS. 4 and 5, based on the user behaviors, characteristics of a topic and/or content that is of interest to at least some of the users of the social network may be determined by activity engine 118. These characteristics may be stored in storage system 122. Note that the topics may include: people, places, fields of research, products, industries, companies, news items, activities, subjects, current events, etc. Moreover, the characteristics may include: attributes, features, qualities, properties, traits, aspects, elements, facets, classifications, etc. of the topics and/or the content.

Subsequently, content-acquisition engine 120 may access video content (such as an image or a video) for the topic. This video content may have associated characteristics. Then, content-acquisition engine 120 may use the user profiles and the characteristics of the video content to identify a subset of the users that are in a position to provide comments about the video content and/or who are relevant to the video content (such as users that are experts about the video content or topic and/or who are influential in the social network on this or similar content or topics). For example, content-acquisition engine 120 may identify the subset of the users based on a statistical association between the attributes in the user profiles and the characteristics of the video content.

Next, content-acquisition engine 120 may iteratively provide requests to one or more of the users in the subset to provide comments about the video content and/or previous comments from the subset of the users. For example, the one or more users may be requested to provide comments about a video (which are sometimes referred to as 'video comments'). In particular, content-acquisition engine 120 may send an email or text message to a user about the video content and/or the previous comments, and may request that the user provide commentary. In this way, the content-acquisition technique can facilitate an ongoing, interactive discussion about the video content.

In response to the requests, one or more of the users may provide comments about or associated with the video content. For example, a user may upload a comment associated with a video to content-acquisition engine 120 via network 112, communication server 114 and network 116. The comment may be stored in storage system 122 and, subsequently, content engine 124 may provide the comment to one or more users of system 100 (and, thus, of the social network), such as in response to requests from one or more electronic devices 110, which are associated with the one or more users, to view the video content and any associated comments.

In these ways, the content-acquisition technique may allow high-quality content that is of interest to the users of a social network to be acquired by users who are in a position to acquire the content and/or who are relevant to this content (and, thus, who are likely to encourage, even implicitly, the members of the social network to view the acquired content). This virtuous cycle may increase the quality and availability of interesting content in the social network, and may increase engagement of the users with the social network. Consequently, the content-acquisition technique may increase user satisfaction with the social network, and may increase user retention and new user acquisition. Therefore, the content-acquisition technique may increase the membership of the social network, and may increase the revenue and/or the profitability of a provider of the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

We now describe embodiments of the content-acquisition technique. FIG. 2 presents a flow chart illustrating a method 200 for recommending content to acquire, which may be performed by a computer system (such as system 100 in FIG. 1 or computer system 500 in FIG. 5). During operation, the computer system optionally receives behavior information (operation 210) specifying user behaviors in the social network, and may optionally analyze the behavior information to identify the characteristics (operation 210) that are of interest to the users.

Then, the computer system obtains information (operation 212) specifying an event having associated characteristics. Moreover, the computer system accesses profiles of users of a social network (operation 214), where each user's profile includes attributes, skills, employment history, and/or education of the user.

Note that the characteristics may include a location and a time. The computer system may optionally dynamically track locations of the users (operation 216) based on location information received from electronic devices associated with the users. Note that the tracked locations may indicate that the collection group of the users is proximate to the event location.

Furthermore, the computer system identifies a collection group of the users (operation 218) based on association between the characteristics and the profiles. In particular, contents of the profiles of the collection group of the users may be relevant to the event. Note that identifying the collection group of the users may involve determining match scores based on association between the characteristics and the profiles, and selecting the collection group of the users based on the match scores. For example, a match score for a user may be a weighted summation of matches between the characteristics and features in the user's profiles (with different features, such as education or work experience, having different weights), and the collection group of the users may be those whose match scores exceed a threshold value. Alternatively or additionally, the collection group of the users may be identified using a predetermined supervised-learning model that relates the characteristics and the profiles. In some embodiments, the supervised-learning model includes one of: a neural network, a classification and regression tree, a support vector machine, a regression model, etc. More generally, the collection group of the users may be identified based on a statistical association (which is sometimes referred to as an 'association') between the characteristics and the information in the profiles. In some embodiments, the collection group of users is identified based on the event location and the tracked locations.

Next, the computer system provides, to the collection group of the users, the recommendation (operation 220) to acquire the content, where the content is associated with the event. Note that the content may include: video, and/or one or more comments about the event (which may be provided by at least one of the users in the collection group).

In some embodiments, the computer system optionally receives the content (operation 222) from at least one user in the collection group of the users. Moreover, the computer system optionally provides the content (operation 224) to other users of the social network. For example, the content may include video, and providing the content may involve converting or transforming the content into formats compatible with displays in electronic devices of the other users.

In an exemplary embodiment, method 200 is implemented using one or more electronic devices and at least one server (and, more generally, a computer system), which communicate through a network, such as a cellular-telephone network and/or the Internet (e.g., using a client-server architecture). This is illustrated in FIG. 3. During this method, computer system 310 (which may implement some or all of the functionality of system 100 in FIG. 1) may monitor activities 312 (or interactions) of the users of electronic devices 110-1, 110-2 and 110-3 in the social network to determine viewing behavior 314 regarding a document. Based on viewing behavior 314, computer system 310 may determine characteristics 316 of events that are potentially of interest to the users.

Then, computer system 310 may obtain information 318 (e.g., from memory 308) specifying an event having at least some of characteristics 316. Moreover, computer system 310 may access profiles 320 of users of a social network (e.g., from memory 308). Using information in profiles 320 and characteristics 316, computer system 310 may identify a collection group 322 of the users (such as a user of electronic device 110-1). For example, collection group 322 may be identified based on association between characteristics 316 and profiles 320.

Next, computer system 310 may provide, to collection group 322 of the users, a recommendation 324 to acquire content 326, where content 326 is associated with the event. In some embodiments, computer system 310 may optionally receive content 326 from at least one user in collection group 322 of the users (such as the user of electronic device 110-1). Moreover, computer system 310 may optionally provide content 326 to other users of the social network (such as the users of electronic devices 110-2 and 110-3) for display or presentation to the other users. Note that content 326 may be optionally provided in response to optional requests 328 for content 326 from the other users.

Figure 4:
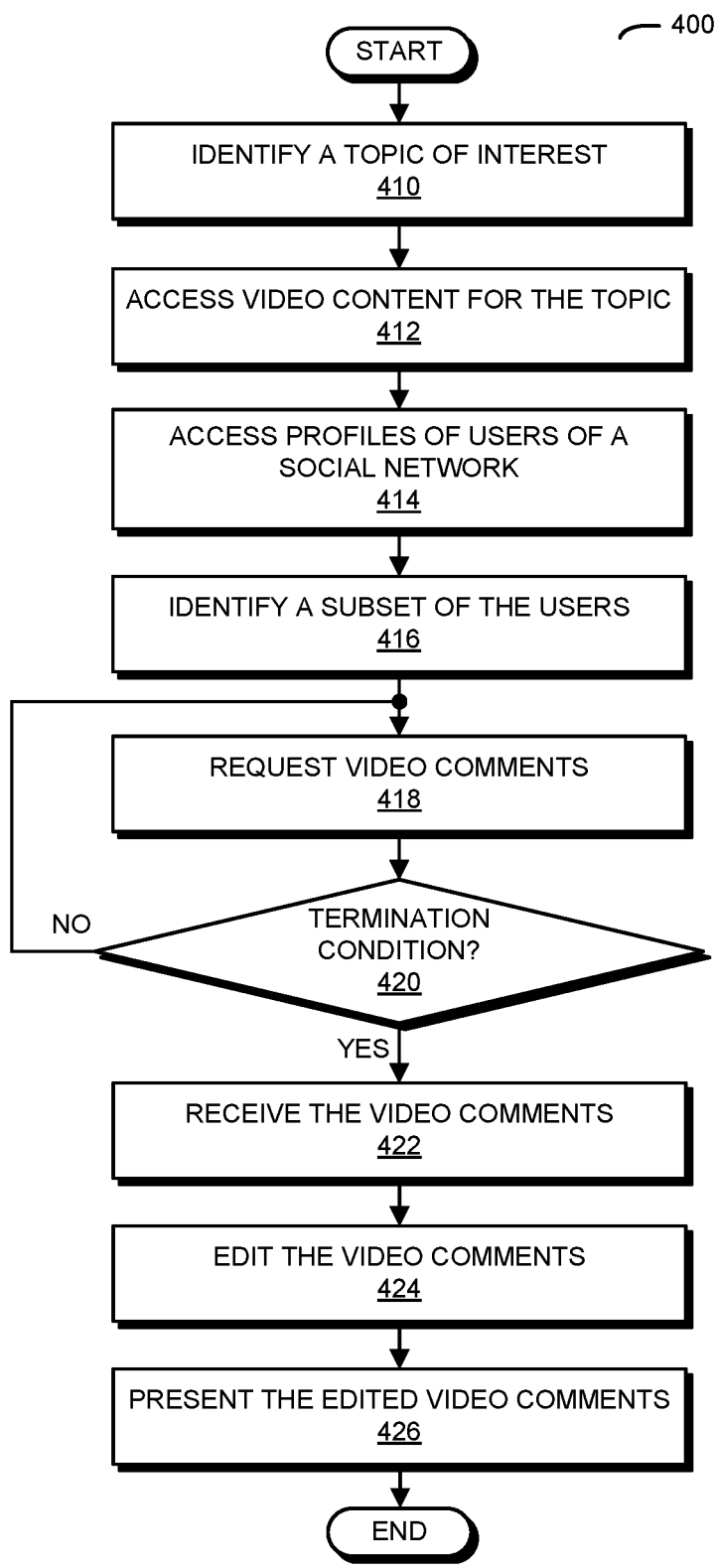
FIG. 4 is a flow chart illustrating a method for facilitating an interactive video discussion in accordance with an embodiment of the present disclosure.
Figure 5:
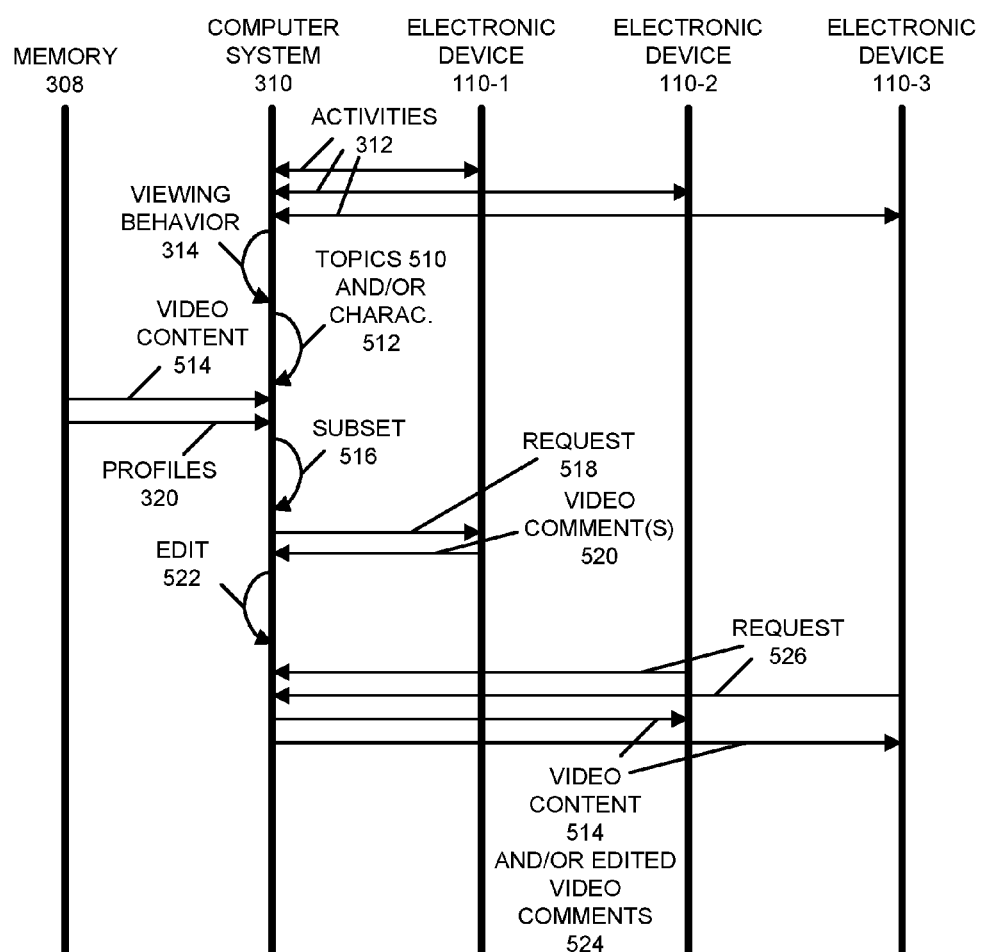
FIG. 5 illustrates communication between the electronic devices of FIG. 1 in accordance with an embodiment of the present disclosure.

FIG. 4 presents a flow chart illustrating a method 400 for facilitating an interactive video discussion, which may be performed by a computer system (such as system 100 in FIG. 1 or computer system 500 in FIG. 5). During operation, the computer system identifies a topic of interest (operation 410) to a set of users of a social network. Then, the computer system accesses video content for the topic (operation 412), where the video content has associated characteristics. (Note that video content is used as an illustrative example in the discussion of method 400.)

Moreover, the computer system accesses profiles of the users of the social network (operation 414), where each user's profile includes attributes, skills, employment history, and/or education of the user. Next, the computer system identifies a subset of the users (operation 416) based on association between the characteristics and the profiles. As described previously in the discussion of FIG. 2, identifying the subset of the users may involve: determining match scores based on association between the content characteristics and the user profiles; and selecting the subset of the users based on the match scores. Alternatively or additionally, the subset of the users may be identified using a predetermined supervised-learning model that relates the characteristics and the profiles. More generally, the subset of the users may be identified based on a statistical association (which is sometimes referred to as an 'association') between the content characteristics and the information in the profiles.

Furthermore, the computer system iteratively requests video comments (operation 418) from the subset of the users about the video content and/or previous video comments from the subset of the users, until a termination condition is achieved (operation 420), such as an elapsed period of time or a number of comments. After receiving the video comments (operation 422), the computer system edits the video comments (operation 424), and the computer system presents the edited video comments (operation 426) to other users of the social network.

For example, the video comments may be received asynchronously from the subset of the users, and editing the video comments (operation 424) may involve reordering the video comments. Alternatively or additionally, editing the video comments (operation 424) may involve removing one or more of the video comments. In particular, the computer system may optionally receive behavior information specifying user behaviors in the social network, and the one or more video comments may be removed based on the user behaviors. Note that the user behaviors may include a number of views of the edited video comments and a duration of the views of the edited video comments. Thus, the one or more comments may be removed to increase the number of views and/or a duration of the views.

In some embodiments, the computer system optionally performs one or more additional operations. For example, prior to iteratively requesting video comments (operation 418), the computer system may optionally: obtain information about an event; identify one or more users of the social network proximate to the event; and recommend the one or more users generate video content about the event. Note that the topic may encompass the event, and the video content for the topic may include video content generated by at least one of the one or more users. Thus, method 400 may include one or more of the operations in method 200 (FIGS. 2 and 3).

Moreover, the computer system may optionally present the video content along with the edited video comments (operation 424). Furthermore, when the content includes video, presenting the video content may involve converting or transforming the video content into formats compatible with displays in electronic devices of the other users.

Additionally, the computer system may optionally receive behavior information specifying user behaviors in the social network, and may optionally analyze the behavior information to identify the topic and/or the characteristics of the video content that interests the users.

In an exemplary embodiment, method 400 is implemented using one or more electronic devices and at least one server (and, more generally, a computer system), which communicate through a network, such as a cellular-telephone network and/or the Internet (e.g., using a client-server architecture). This is illustrated in FIG. 5. During this method, computer system 310 (which may implement some or all of the functionality of system 100 in FIG. 1) may monitor activities 312 (or interactions) of the users of electronic devices 110-1 and 110-2 in the social network to determine viewing behavior 314 regarding a document. Based on viewing behavior 314, computer system 310 may determine or identify topics 510 and/or characteristics 512 of content that are potentially of interest to the users.

Then, computer system 310 may access video content 514 (e.g., in memory 308) for topic 510 having at least some of characteristics 512. Moreover, computer system 310 may access profiles 320 of users of a social network (e.g., from memory 308). Using information in profiles 320 and characteristics 512, computer system 310 may identify a subset 516 of the users (such as a user of electronic device 110-1). For example, subset 516 may be identified based on association between characteristics 512 and profiles 320.

Next, computer system 310 may iteratively request 518 video comments 520 from subset 516 of the users about video content 514, and possibly about previous video comments from the subset of the users. In response, computer system 310 may optionally receive video comments 520 from at least one user in subset 516 (such as a user of electronic device 110-1). Furthermore, computer system 310 may edit 522 video comments 520, and then may present the edited video comments 524 to other users of the social network (such as the users of electronic devices 110-2 and 110-3) for display or presentation to the other users. Note that video content 514 and the edited video comments 524 may be optionally provided in response to optional requests 526 from the other users.

In some embodiments of methods 200 (FIGS. 2 and 3) and/or 400 (FIGS. 4 and 5), there may be additional or fewer operations. Moreover, the order of the operations may be changed, and/or two or more operations may be combined into a single operation.

In an exemplary embodiment, the content-acquisition technique is used to improve the quality of engagement of users with a social network by facilitating topic-driven video conversations. The computer system may track a variety of performance metrics and user behaviors when viewing content (such as videos) to allow characteristics of content and topics that are of interest to the users to be determined. For example, the performance metrics and user behaviors may include: the most-popular videos, the average-time watched, the percentage or duration watched, etc.

Note that the videos may be less than 30 seconds long, and that the videos may be acquired and posted in response to recommendations from the computer system. The posted videos may be automatically played to interested users or the videos may be played in response to user requests.

The videos and the related comments may provide a quick, visual way to communicate about topics. Moreover, this approach may allow the users to hear from thought leaders and to see their perspective in the form of posted videos. For influencers and members who want to establish themselves as experts, the content-acquisition technique can provide a quick visual way to communicate about professional topics.

Consequently, the computer system may create professionally oriented video content through these topic-driven video conversations. As noted previously, the video content may be in the form of short, socially distributed video recorded on mobile or portable electronic devices in response to topic prompts or recommendations. Note that the collection group and/or the subset of the users may include influencers (such as users in the social network who have lots of followers or whose content and comments are widely followed, e.g., by more than 10 other users). However, more generally, the content and/or comments may be provided by an arbitrary user. Thus, using the computer system, members of a social network may share their insights on the topics that matter in their professional world by publishing posts in order to establish themselves as experts. Because they are backed by user's professional identities, the quality of engagement and commentary in these posts is typically very high.

In addition to allowing influencers and other members to readily share their expertise or to provide a glimpse of their professional lives by recording short videos in response to topic prompts or recommendations, the computer system may also allow members to watch collections of the best videos about a topic they are interested in. Thus, the computer system may allow users to 'sit in' on panel discussions that are of interest. For video viewers, this approach can provide uncommon access, an opportunity to hear from thought leaders and to see through their eyes. In particular, the content-acquisition technique can provide a panel discussion backed by professional identity and brought to life with video.

For example, users can watch: product designers demonstrate their favorite details in a new product; investors and entrepreneurs weighing in on the impact of regulatory changes on the sharing economy; a behind-the-scenes look at the most interesting new products at the consumer-electronics show; and/or a 30-second tour of the influencers' desks.

Using an application that executes in the environment of a portable electronic device, influencers and members may be able to: record short (such as 30 s) videos in response to a relevant topical prompt or recommendation from the computer system; create a new topic and record a video about it; and invite others to add a response or a comment about a topic for which they have recorded a video.

In general, the video recording may be easy, and video creators may receive feedback about how their videos are performing in the social network. Similarly, consuming video may be seamless, and may not merely be passive. Instead, it may represent an invitation for the users to join a topical conversation.

In some embodiments, the computer system may edit the videos and/or the comments, such as by removing and/or changing the order of the videos and comments. However, in some embodiments editors can curate the best video responses into auto-playing 'conversations.' The members can watch these video playlists inside and outside of the social network.

Note that the users may watch the videos because such a curated, topical video discussion may be unavailable elsewhere. Moreover, this content-acquisition technique may result in professional, topical videos that can be viewed independently or as part of a thread and may be backed by professional identity. Also, the videos may be focused on particular topics (such as those of interest to professionals), and/or may allow round-table discussions based on particular topics.

In an exemplary embodiment, the content-acquisition technique uses smart topic prompting to encourage users to acquire videos (and, more generally, content) and/or to provide comments on existing videos or content. For example, a user may be asked to comment on the topic of fire safety, and in the process may enhance their reputation in the social network (and beyond). The users may be identified based on a statistical association between what is known about the users in their profiles and metadata (such as characteristics) associated with events, topics and/or content. In some embodiments, the computer system determines the metadata by analyzing video and/or audio.

Thus, the computer system may attempt to identify the best people for a particular event, topic and/or content. For example, based on their skills, their value (such as based on their endorsements), work history, education, influential position in a community (such as the social network), a collection group and/or a subset of the users may be identified to attend an upcoming sales conference and to acquire video of particular talks or sessions.

Because the events may be localized and transient, the current location of the users may be dynamically tracked and used to identify the best users for inclusion in the collection group and/or the subset of users at a given time and place. The users in the collection group and/or the subset may be encouraged to record video, provide their perspective or viewpoint, etc.

The resulting dynamic trove of content may allow the computer system to function as a broadcaster or a content creator. In particular, the computer system may aggregate video conversations of the best people in the social network. In the process, the computer system may facilitate interactive conversations among the users. Then, the computer system may automatically (or semi-automatically) steer and curate a conversation using dynamic and interactive editing. The resulting comments may be received asynchronously. But the computer system may make the discussion relevant and comprehensible by reordering the comments into a coherent narrative.

Thus, the computer system may allow users to dynamically consume and create topically relevant content.

In an exemplary embodiment, the computer system determines that users who work in finance are interested in economic topics and content that includes characteristics such as continuing education for accounting professionals based on their viewing habits in the social network. When a schedule indicates that a member of the Federal Reserve will be speaking at a conference in New York City later that day, the computer system may identify a collection group of the users who are experts at Federal Reserve policy decisions based on their education (such as those having advanced degrees in economics), work experience (such as those who have mid-level jobs in financial forecasting), and location (such as those who work in mid-town Manhattan and who are currently near the conference site). Then, the computer system may provide a recommendation to the collection group of the users to go to the conference and acquire video of the speech.

Alternatively or additionally, the computer system may identify a subset of the users who are relevant and can comment on the video of the speech, e.g., users who have worked at the Federal Reserve and who have regularly published widely viewed articles and blogs on this topic. Then, the computer system may request that the subset of the users provide comments about the video of the speech. These comments may be edited to organize the flow of the resulting discussion. In particular, digressions may be removed and similar comments about the same aspects of the speech or the Federal Reserve's pending decision may be grouped together (even if these comments are received from users in the subset of the other users at different times).

Figure 6:
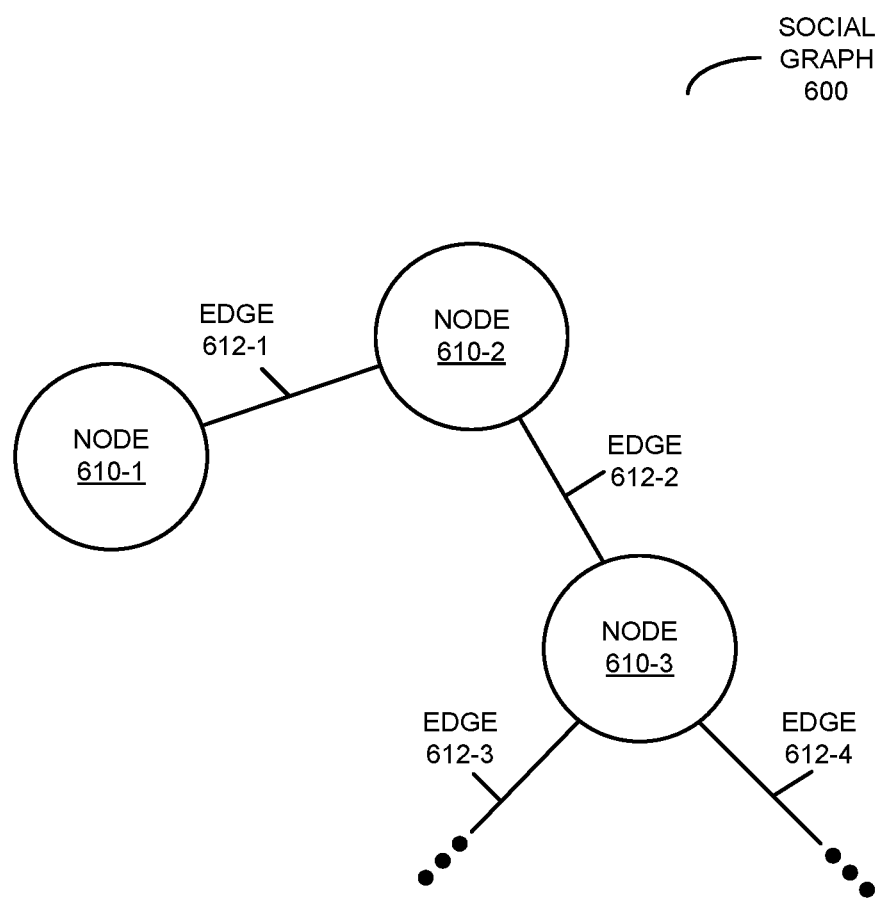
FIG. 6 is a drawing illustrating a social graph in accordance with an embodiment of the present disclosure.

We now further describe the profiles of the users or members of the social network. Information in the profile of a user may, at least in part, be specified or included in a social graph or a portion of a social graph that is formed from the user's connections in the social network. FIG. 6 presents a drawing illustrating a social graph 600. This social graph may represent the connections or interrelationships among nodes 610 (corresponding to entities) using edges 612. In the context of the content-acquisition technique, one of nodes 610 (such as node 610-1) may correspond to the user, and the remainder of nodes 610 may correspond to other users (or groups of users) in the social network. Therefore, edges 612 may represent interrelationships among these users, such as companies where they worked, schools they attended, organizations (companies, schools, etc.) that the individuals are (or used to be) associated with, interests of the users (such as in particular topics or types of content), etc.

In general, a given node in social graph 600 may be associated with a wide variety of information that is included in user profiles, including attributes such as: age, gender, geographic location, work industry for a current employer, functional area (e.g., engineering, sales, consulting), seniority in an organization, employer size, schools attended, previous employers, current employer, professional development, interest segments, target groups, additional professional attributes and/or inferred attributes (which may include or be based on user behaviors). Furthermore, user behaviors may include log-in frequencies, search frequencies, search topics, browsing certain web pages, locations (such as IP addresses) associated with the users, advertising or recommendations presented to the users, user responses to the advertising or recommendations, likes or shares exchanged by the users, and/or interest segments for the likes or shares (such as topics that are of interest to the users and/or characteristics of content that is of interest to the users). As noted previously, one or more of these features may be used in a supervised-learning model to facilitate selection of the collection group and/or the subset of the users during the content-acquisition technique.

Figure 7:
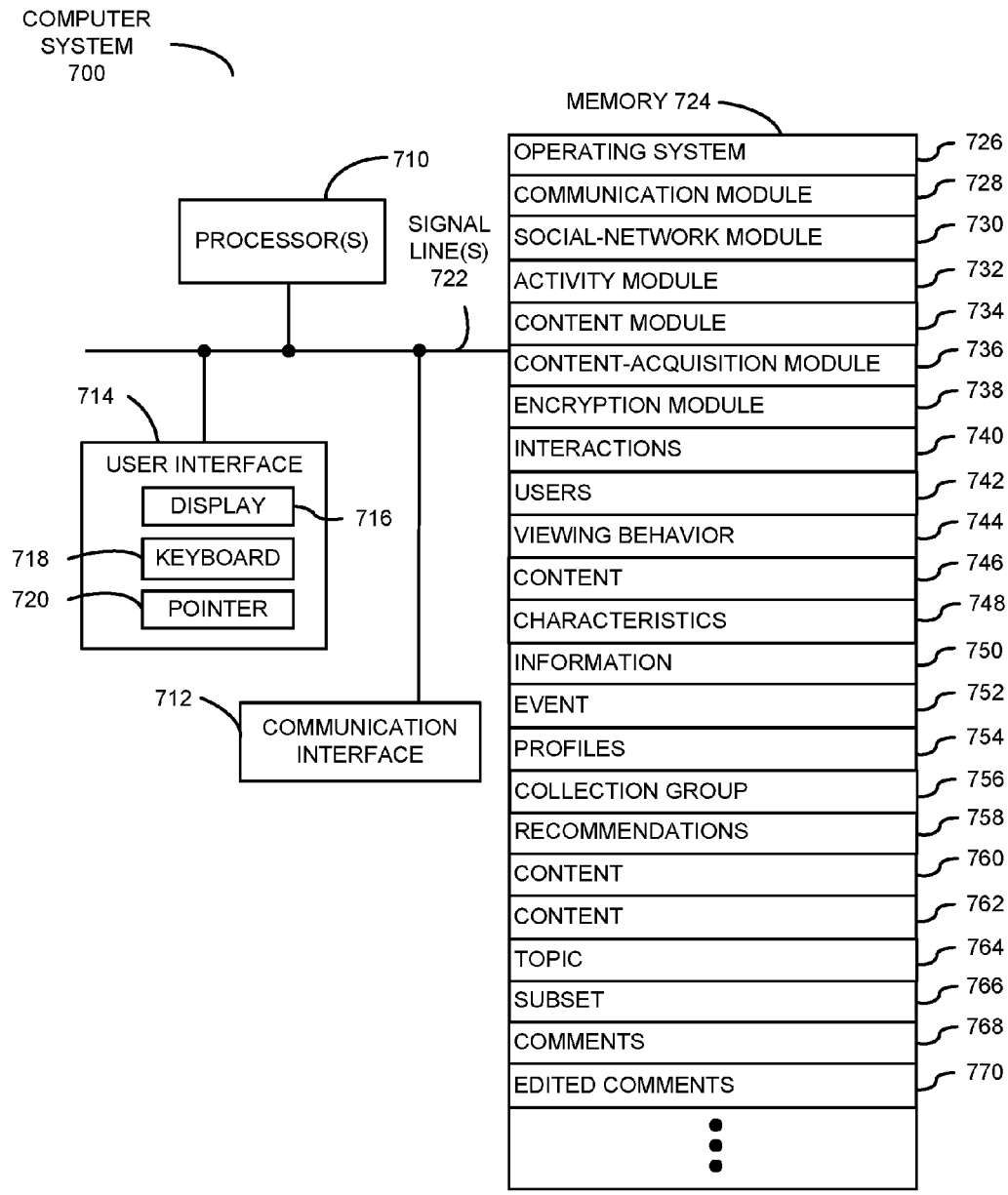
FIG. 7 is a block diagram illustrating a computer system that performs the methods of FIGS. 2-5 in accordance with an embodiment of the present disclosure.

We now describe embodiments of a computer system for performing the content-acquisition technique and its use. FIG. 7 presents a block diagram illustrating a computer system 700 that performs methods 200 (FIGS. 2 and 3) and/or 400 (FIGS. 4 and 5), such as system 100 in FIG. 1 or computer system 310 in FIG. 3. Computer system 700 includes one or more processing units or processors 710 (which are sometimes referred to as 'processing modules'), a communication interface 712, a user interface 714, memory 724, and one or more signal lines 722 coupling these components together. Note that the one or more processors 710 may support parallel processing and/or multi-threaded operation, the communication interface 712 may have a persistent communication connection, and the one or more signal lines 722 may constitute a communication bus. Moreover, the user interface 714 may include: a display 716 (such as a touchscreen), a keyboard 718, and/or a pointer 720 (such as a mouse).

Memory 724 in computer system 700 may include volatile memory and/or non-volatile memory. More specifically, memory 724 may include: ROM, RAM, EPROM, EEPROM, flash memory, one or more smart cards, one or more magnetic disc storage devices, and/or one or more optical storage devices. Memory 724 may store an operating system 726 that includes procedures (or a set of instructions) for handling various basic system services for performing hardware-dependent tasks. Memory 724 may also store procedures (or a set of instructions) in a communication module 728. These communication procedures may be used for communicating with one or more computers and/or servers, including computers and/or servers that are remotely located with respect to computer system 700.

Memory 724 may also include multiple program modules, including: social-network module 730, activity module 732, content module 734, content-acquisition module 736, and/or encryption module 738. Note that one or more of these program modules (or sets of instructions) may constitute a computer-program mechanism, i.e., software.

During operation of computer system 700, social-network module 730 facilitates interactions 740 among users 742 via communication module 728 and communication interface 712. These interactions may be tracked by activity module 732, and may include viewing behavior 744 of users 742 when viewing content 746, provided by content module 734, in a social network that is implemented using social-network module 730.

Then, content-acquisition module 736 may determine characteristics 748 of events, content and/or topics that are potentially of interest to users 742 based on viewing behavior 744. Moreover, content-acquisition module 736 (such as an event module) may obtain (e.g., via communication interface 712 and communication module 728 or based on predefined information in memory 724) information 750 specifying an event 752 having at least some of characteristics 748.

Furthermore, content-acquisition module 736 (such as a selection module) may access profiles 754 of users 742 of the social network. Using information in profiles 754 and characteristics 748, content-acquisition module 736 may identify a collection group 756 of users 742. Next, content-acquisition module 736 (such as a recommendation module) may provide, to collection group 756 of the users, one or more recommendations 758 via communication module 728 and communication interface 712 to acquire content 760, where content 760 is associated with event 752. After receiving content 760 via communication interface 712 and communication module 728, content module 734 may provide content 760 to other users 742 of the social network via communication module 728 and communication interface 712.

Alternatively or additionally, content-acquisition module 736 may access content (such as content 762) for a topic 764 having at least some of characteristics 748. Moreover, content-acquisition module 736 (such as the selection module) may access profiles 754 of users 742 of the social network. Using information in profiles 754 and characteristics 748, content-acquisition module 736 may identify a subset 766 of users 742. Then, content-acquisition module 736 (such as a comment-moderation module) may iteratively request, from subset 766 of the users, comments 768 about content 762 and/or previous comments via communication module 728 and communication interface 712. After receiving comments 768 via communication interface 712 and communication module 728, content-acquisition module 736 may edit comments 768 to create edited comments 770. Next, content module 734 may provide content 762 and edited comments 770 to other users 742 of the social network via communication module 728 and communication interface 712.

Because information in computer system 700 may be sensitive in nature, in some embodiments at least some of the data stored in memory 724 and/or at least some of the data communicated using communication module 728 is encrypted using encryption module 738.

Instructions in the various modules in memory 724 may be implemented in a high-level procedural language, an object-oriented programming language, and/or in an assembly or machine language. Note that the programming language may be compiled or interpreted, e.g., configurable or configured, to be executed by the one or more processors.

Although computer system 700 is illustrated as having a number of discrete items, FIG. 7 is intended to be a functional description of the various features that may be present in computer system 700 rather than a structural schematic of the embodiments described herein. In practice, and as recognized by those of ordinary skill in the art, the functions of computer system 700 may be distributed over a large number of servers or computers, with various groups of the servers or computers performing particular subsets of the functions. In some embodiments, some or all of the functionality of computer system 700 is implemented in one or more application-specific integrated circuits (ASICs) and/or one or more digital signal processors (DSPs).

Computer systems (such as computer system 700), as well as electronic devices, computers and servers in system 100 (FIG. 1), may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 112 (FIG. 1) may include: the Internet, World Wide Web (WWW), an intranet, a cellular-telephone network, LAN, WAN, MAN, or a combination of networks, or other technology enabling communication between computing systems.

System 100 (FIG. 1) and/or computer system 700 may include fewer components or additional components. Moreover, two or more components may be combined into a single component, and/or a position of one or more components may be changed. In some embodiments, the functionality of system 100 (FIG. 1) and/or computer system 700 may be implemented more in hardware and less in software, or less in hardware and more in software, as is known in the art.

While a social network has been used as an illustration in the preceding embodiments, more generally the content-acquisition technique may be used to aggregate content in a wide variety of applications or systems, including news, media, online forums and entertainment applications. Moreover, the content-acquisition technique may be used in applications where the communication or interactions among different entities (such as people, organizations, etc.) can be described by a social graph. Note that the people may be loosely affiliated with a website (such as viewers or users of the website), and thus may include people who are not formally associated (as opposed to the users of a social network who have user accounts). Thus, the connections in the social graph may be defined less stringently than by explicit acceptance of requests by individuals to associate or establish connections with each other, such as people who have previously communicated with each other (or not) using a communication protocol, or people who have previously viewed each other's home pages (or not), etc. In this way, the content-acquisition technique may be used to expand the quality of interactions and value-added services among relevant or potentially interested people in a more loosely defined group of people.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-system-implemented method for facilitating an interactive video discussion, the method comprising:
identifying a topic of interest to a set of users of a social network;
accessing video content for the topic, wherein the video content has associated characteristics;
accessing profiles of the users of the social network, wherein each user's profile includes attributes, skills, employment history, and education of the user;
identifying a subset of the users based on association between the characteristics and the profiles;
iteratively requesting video comments from the subset of the users about the video content and previous video comments from the subset of the users;
editing the video comments; and
presenting the edited video comments to other users of the social network.

2. The method of claim 1, further comprising, prior to iteratively requesting video comments:
obtaining information about an event;
identifying one or more users of the social network proximate to the event; and
recommending the one or more users generate video content about the event;
wherein the topic encompasses the event; and
wherein the video content for the topic comprises video content generated by at least one of the one or more users.

3. The method of claim 1, wherein:
the video comments are received asynchronously from the subset of the users; and
editing the video comments involves reordering the video comments.

4. The method of claim 1, wherein editing the video comments involves removing one or more of the video comments.

5. The method of claim 4, wherein:
the method further comprises receiving behavior information specifying user behaviors in the social network; and
the one or more video comments are removed based on the user behaviors.

6. The method of claim 5, wherein the user behaviors include a number of views of the edited video comments and a duration of the views of the edited video comments.

7. The method of claim 1, wherein the method further comprises:
receiving behavior information specifying user behaviors in the social network; and
analyzing the behavior information to identify the topic.

8. The method of claim 7, wherein the method further comprises analyzing the behavior information to identify the characteristics of the video content that interests the users.

9. The method of claim 1, wherein identifying the subset of the users involves:
determining match scores based on association between the characteristics and the profiles; and
selecting the subset of the users based on the match scores.

10. The method of claim 1, wherein:
the method further comprises presenting the video content along with the edited video comments;
the video content includes video; and
presenting the video content involves converting the video content into formats of displays in electronic devices of other users of the social network.

11. An apparatus, comprising:
one or more processors;
memory; and
a program module, wherein the program module is stored in the memory and, during operation of the apparatus, is executed by the one or more processors to facilitate an interactive video discussion, the program module including:
instructions for identifying a topic of interest to a set of users of a social network;
instructions for accessing video content for the topic, wherein the video content has associated characteristics;
instructions for accessing profiles of the users of the social network, wherein each user's profile includes attributes, skills, employment history, and education of the user;
instructions for identifying a subset of the users based on association between the characteristics and the profiles;
instructions for iteratively requesting video comments from the subset of the users about the video content and previous video comments from the subset of the users;
instructions for editing the video comments; and
instructions for presenting the edited video comments to other users of the social network.

12. The apparatus of claim 11, wherein the program module further comprises, prior to the instructions for iteratively requesting video comments, instructions for:
obtaining information about an event;
identifying one or more users of the social network proximate to the event; and
recommending the one or more users generate video content about the event;
wherein the topic encompasses the event; and
wherein the video content for the topic comprises video content generated by at least one of the one or more users.

13. The apparatus of claim 11, wherein:
the video comments are received asynchronously from the subset of the users; and
the instructions for editing the video comments include instructions for reordering the video comments.

14. The apparatus of claim 11, wherein the instructions for editing the video comments include instructions for removing one or more of the video comments.

15. The apparatus of claim 14, wherein:
the program module further comprises instructions for receiving behavior information specifying user behaviors in the social network; and
the one or more video comments are removed based on the user behaviors.

16. The apparatus of claim 15, wherein the user behaviors include a number of views of the edited video comments and a duration of the views of the edited video comments.

17. The apparatus of claim 16, wherein the program module further comprises:
instructions for receiving behavior information specifying user behaviors in the social network; and
instructions for analyzing the behavior information to identify the characteristics of the video content that interests the users.

18. The apparatus of claim 11, wherein the instructions for identifying the subset of the users includes:
   instructions for determining match scores based on association between the characteristics and the profiles; and
   instructions for selecting the subset of the users based on the match scores.

19. The apparatus of claim 11, wherein:
   the program module further comprises instructions for presenting the video content along with the edited video comments;
   the video content includes video; and
   the instructions for presenting the video content include instructions for converting the video content into formats of displays in electronic devices of other users of the social network.

20. A system, comprising:
   a content non-transitory computer-readable medium including instructions that, when executed, cause the system to:
      identify a topic of interest to a set of users of a social network; and
      access video content for the topic, wherein the video content has associated characteristics;
   a selection non-transitory computer-readable medium including instructions that, when executed, cause the system to:
      access profiles of the users of the social network, wherein each user's profile includes attributes, skills, employment history, and education of the user; and
      identify a subset of the users based on association between the characteristics and the profiles; and
   a comment-moderation non-transitory computer-readable medium including instructions that, when executed, cause the system to:
      iteratively request video comments from the subset of the users about the video content and previous video comments from the subset of the users;
      edit the video comments; and
      present the edited video comments to other users of the social network.

* * * * *